M. S. DAVIS.
Improvement in Mechanical Movement.
No. 127,855. Patented June 11, 1872.
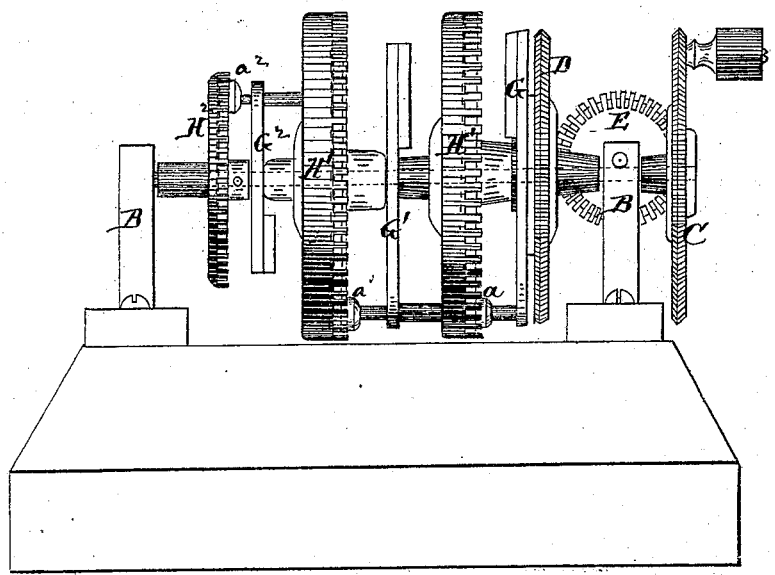
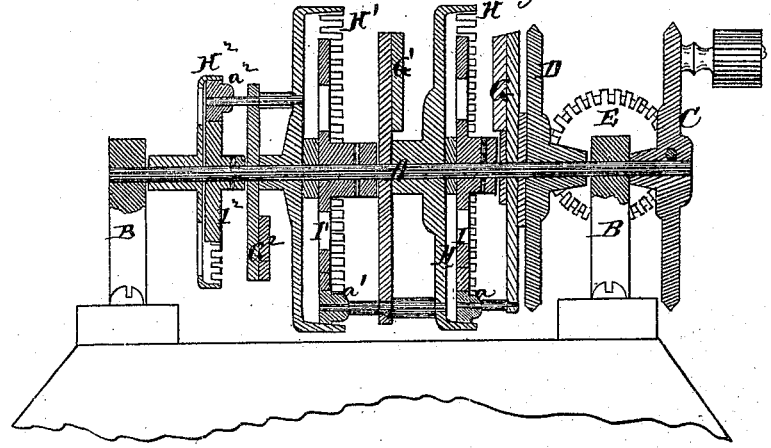
Witnesses:
Franck L. Durand
C. L. Evert
Inventor:
Martin S. Davis
per Alexander Mason
Attorneys.

UNITED STATES PATENT OFFICE.

MARTIN S. DAVIS, OF VINCENNES, INDIANA.

IMPROVEMENT IN MECHANICAL MOVEMENTS.

Specification forming part of Letters Patent No. 127,855, dated June 11, 1872.

*To all whom it may concern:*

Be it known that I, MARTIN S. DAVIS, of Vincennes, in the county of Knox and in the State of Indiana, have invented certain new and useful Improvements in Mechanical Movement; and do hereby declare that the following is a full, clear, and exact description thereof, reference being had to the accompanying drawing and to the letters of reference marked thereon making a part of this specification.

The nature of my invention consists in a mechanical movement to increase the speed of machinery, as will be hereinafter more fully set forth.

In order to enable others skilled in the art to which my invention appertains to make and use the same, I will now proceed to describe its construction and operation, referring to the annexed drawing, in which—

Figure 1 is a side elevation, and Fig. 2 a longitudinal vertical section of my invention.

A represents a shaft, resting and revolving in suitable bearings B B, and provided at one end with a wheel, C, keyed or otherwise firmly affixed to the shaft. To this wheel, or to a pulley also affixed on the shaft A, the power may be applied. The wheel C is a miter-wheel, gearing with a similar wheel, E, placed upon a short shaft extending from one of the supports or bearings B, and this wheel, in turn, gears with a third miter-wheel, D, placed loosely upon the shaft A; hence when the said shaft revolves the wheels C and D revolve in the opposite directions, the former with the shaft, and the latter independent of and in the opposite direction from the shaft. $a$ is a pinion, placed on a stud in the end of a bar, G, attached to the wheel D, the shaft A passing through the center of said bar; or the stud of the pinion $a$ may be attached to the wheel D itself without the intermediate bar G. The pinion $a$ gears with a large wheel, H, and a smaller wheel, I, the latter being an ordinary cog-wheel, keyed or otherwise firmly attached to the shaft A, while the former wheel H has a rim projecting inward, with cogs formed as shown in the drawing, and is placed loosely upon the shaft A.

The wheel I revolving with the shaft, and the pinion-stud moving with the wheel D in the opposite direction, and the pinion $a$ connecting the two wheels I and H, the effect is that the wheel H will revolve in the opposite direction to that of the wheel I or the shaft A, and twice as fast as the wheel D. In like manner, by the addition of a pinion, $a^1$, to the wheel H, and two similar wheels, $H^1$ and $I^1$, on the shaft A, the wheel $H^1$ will revolve twice as fast as the wheel H, and so on, as many sets of wheels and pinions as may be desired, each set doubling the speed of the preceding set.

By this device the speed may be increased indefinitely without any material, if any, loss of power, and it may be applied to any machinery where high speed is desired.

Having thus fully described my invention, what I claim as new, and desire to secure by Letters Patent, is—

The combination of the weighted levers G $G^1$ $G^2$ with studs and pinions $a$ $a^1$ $a^2$, with the flanged toothed wheels H $H^1$ $H^2$, and inclosed gears I $I^1$ $I^2$, all mounted upon the shaft A, as described, and constructed to operate substantially as set forth.

In testimony that I claim the foregoing I have hereunto set my hand this 1st day of April, 1872.

MARTIN S. DAVIS.

Witnesses:
 JOHN D. TINE,
 C. L. EVERT.